United States Patent [19]

Bonkowski

[11] Patent Number: 5,070,992
[45] Date of Patent: Dec. 10, 1991

[54] CONVEYOR SYSTEM
[75] Inventor: Lorne Bonkowski, Stockton, Calif.
[73] Assignee: Forma-Pack, L.P., Stockton, Calif.
[21] Appl. No.: 675,128
[22] Filed: Mar. 25, 1991

Related U.S. Application Data

[63] Continuation of Ser. No. 301,223, Jan. 24, 1989, abandoned.

[51] Int. Cl.$^5$ .................. B65B 35/44; B65B 21/04
[52] U.S. Cl. .................. 198/419.1; 198/463.6; 53/543
[58] Field of Search .................. 198/419.1, 463.6; 53/48.1, 543, 539, 48.3, 48.4

[56]       References Cited
       U.S. PATENT DOCUMENTS

| | | | |
|---|---|---|---|
| 2,771,177 | 11/1956 | Cutter et al. | 198/419.1 |
| 2,858,009 | 10/1958 | Bainbridge | 198/419.1 |
| 3,653,178 | 4/1972 | Bauer | 53/543 |
| 4,041,677 | 8/1977 | Reid | 53/543 |
| 4,285,185 | 8/1981 | Collura et al. | 53/48.1 |
| 4,642,967 | 2/1987 | Culpepper | 198/419.1 X |

Primary Examiner—Horace M. Culver
Attorney, Agent, or Firm—Spensley Horn Jubas & Lubitz

[57]           ABSTRACT

A conveyor system is provided which is capable of forming precisely positioned arrays of containers for packing and other processing operations. Unique alignment pins are provided for stopping the advancement of containers being conveyed by conveyor belts. Each pin has a top surface shaped to conform substantially to the contour of the gap defined by the bases of two adjacent touching containers. The top surface engages the bases of passing containers when the pin is in its retracted position.

3 Claims, 12 Drawing Sheets

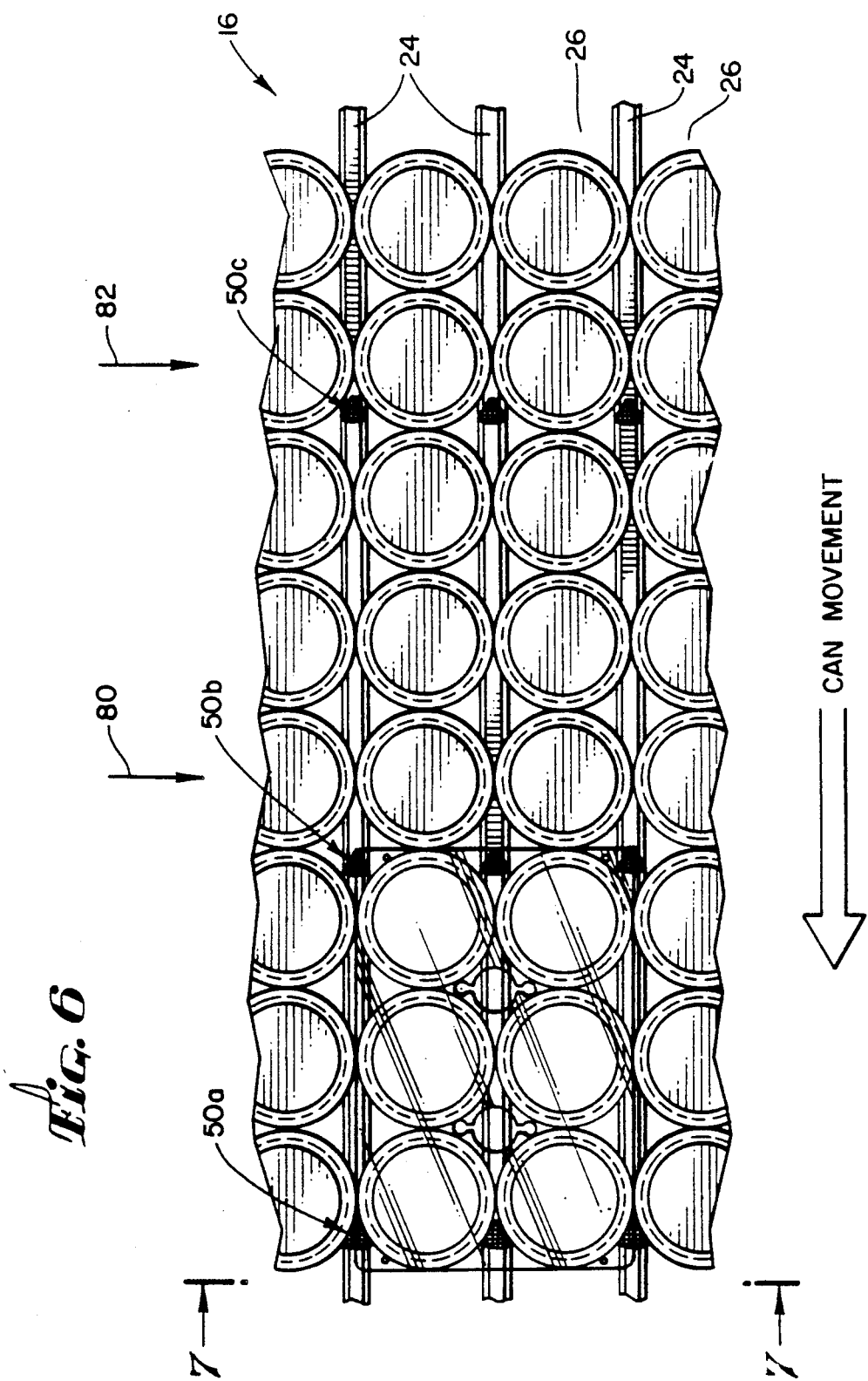

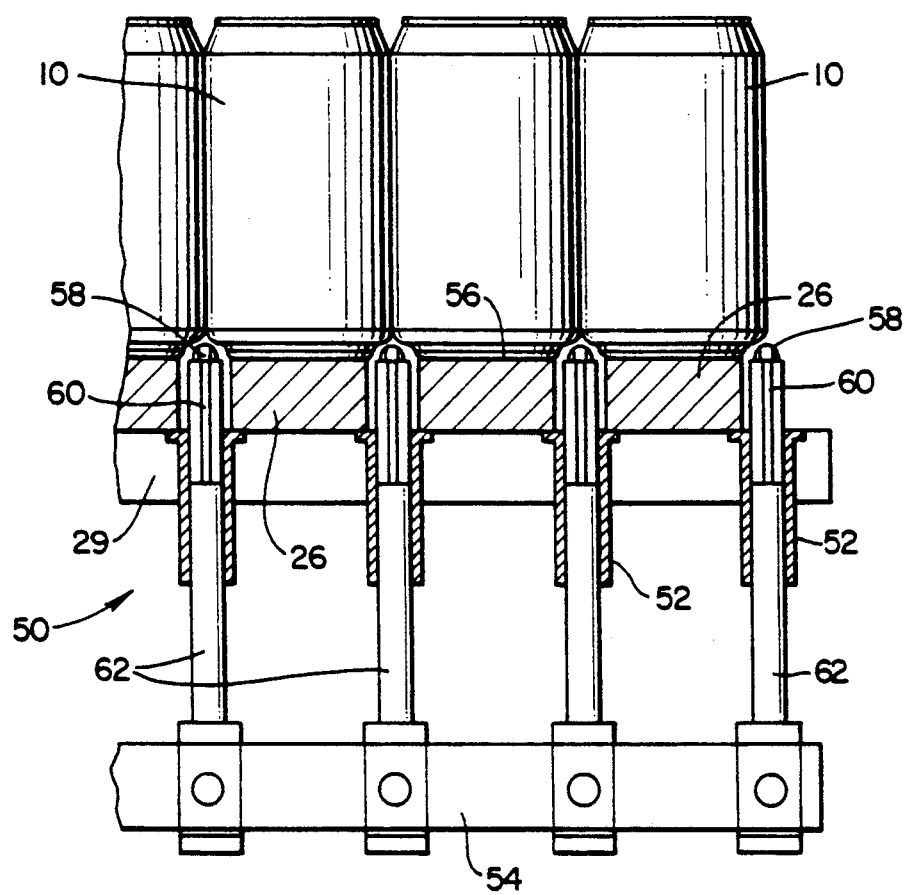

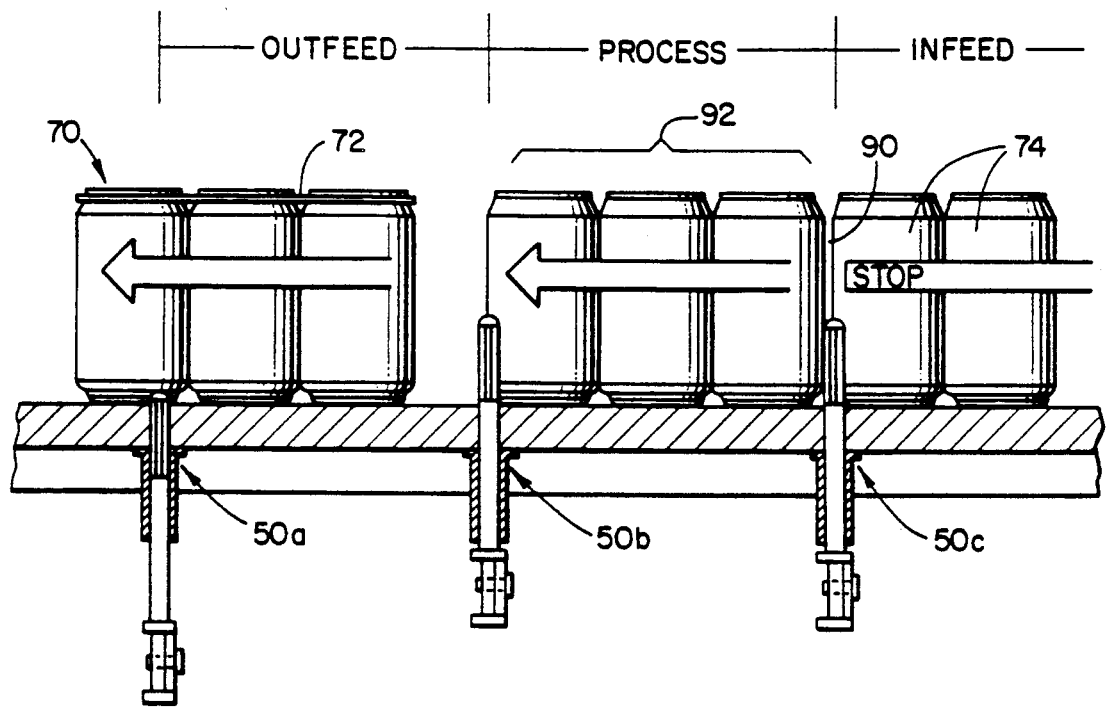
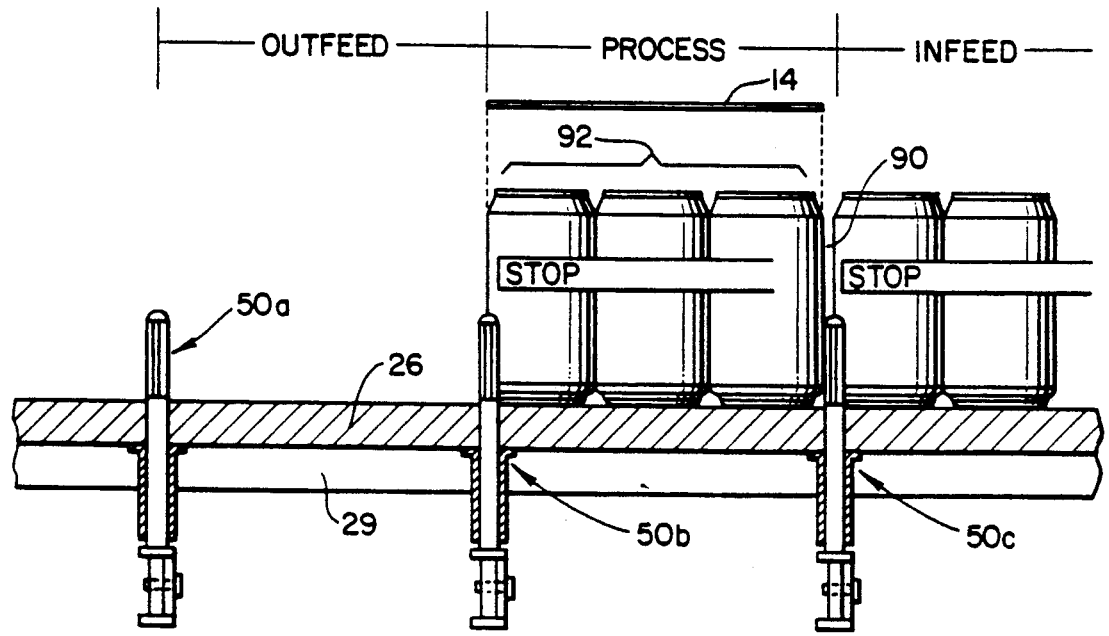

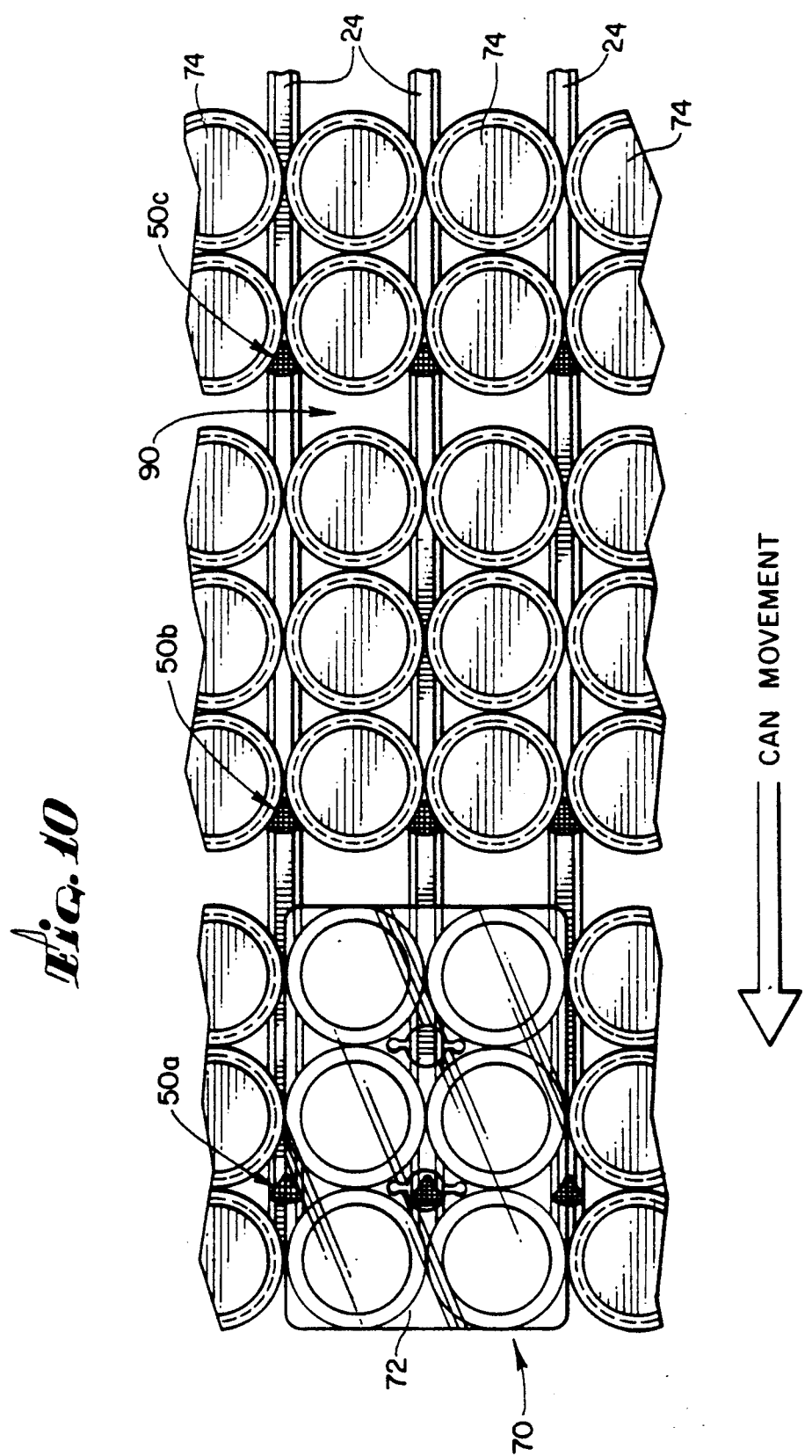

CONVEYOR SYSTEM

This is a continuation of application Ser. No. 301,223 filed on Jan. 24, 1989, and now abandoned.

BACKGROUND OF THE INVENTION

1. Field of the Invention

The present invention relates to conveyor systems, and more particularly to conveyor systems for conveying containers.

2. Description of Related Art

Conveyor systems are widely used in manufacturing and food processing plants for transporting containers such as cans, bottles, boxes, etc., from station to station as the containers are filled, sealed, labeled and packaged for shipment. The conveyor system typically includes a moving closed loop belt on which the containers are placed. Once the conveyor belt brings the containers to a work station, mechanical devices are often needed to position the containers for further processing. For example, one popular package for beverage containers such as beer and soft drink cans is the "6-pack" which has six containers arranged in a two by six orthogonal matrix. However, round containers such as cans when placed on a conveyor belt and allowed to "back up" under the pressure of the moving underlying conveyor belt, tend to form a tight block of cans in a more or less "honeycomb" configuration as illustrated in FIG. 1. The honeycomb configuration is more stable than an orthogonal array such that cans initially placed in an orthogonal array and subjected to a moving and vibrating conveyor belt quickly move back toward the honeycomb configuration. Unfortunately, the honeycomb configuration is unacceptable for many commercial 6-pack packaging machines. Consequently, many such packaging machines use various mechanical devices such as star wheels to isolate individual cans and move them to form two converging rows of cans for packaging. However, these prior devices are not readily adaptable to packaging machines which can package large arrays of containers having more than two rows in the array.

SUMMARY OF THE INVENTION

It is an object of the present invention to provide an improved conveyor system obviating, for practical purposes, the above mentioned limitations, particularly in a manner requiring a relatively uncomplicated mechanical arrangement.

These and other objects and advantages are achieved in a conveyor system having, in accordance with one embodiment of the present invention, a staging mechanism for forming large arrays of containers such as cans. In the illustrated embodiment, the conveyor system includes a plurality of alignment pins positioned adjacent a moving conveyor belt, wherein the alignment pins are spaced to define a plurality of stations such as outfeed, packaging and infeed stations. The alignments pins are cyclicly retracted to allow containers to pass on the conveyor belt and then extended into the path of containers to momentarily stop the containers on the conveyor belt in such a manner as to group the containers in a precisely positioned array for processing. In such a system, the arrays may be arbitrarily large so as not to limit the capacity of the packaging machine. In addition, the staging operations can be adapted to relieve can line pressure from a specific group or array of cans so as to isolate the group along the conveyor. As a consequence, the cans can be packaged unhampered by neighboring cans or fluctuations in the diameter of cans caused by variable line pressure.

In another aspect of the present invention, divider rails are provided between closely spaced conveyor belts which allow cans in the conveyor system to touch side by side but not cross to another conveyor belt. In the illustrated embodiment, the dividier rails each have a cross-sectional shape adapted to conform substantially to the cross-sectional shape of the gap between the bases of adjacent touching cans.

These and other objects and advantages will be made more clear in connection with the following detailed description and drawings.

BRIEF DESCRIPTION OF THE DRAWINGS

FIG. 6 is an enlarged view of a portion of the conveyor system of FIG. 3.

FIGS. 7(a) and 7(b) are cross-sectional views of the conveyor system of FIG. 6 as viewed along the line 7—7 and depict the alignment pins in the retracted and deployed positions, respectively.

FIGS. 9(a)–9(f) illustrate the staging operations of the alignment pins of the conveyor system of FIG. 3.

FIG. 10 is a top view of the staging operation illustrated in FIG. 9(e).

DETAILED DESCRIPTION OF THE DRAWINGS

Figure 1:
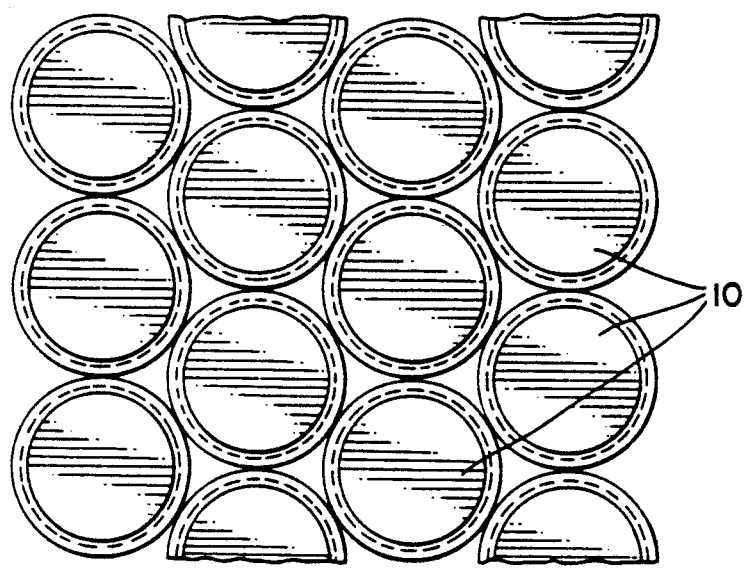
FIG. 1 is a top view of a plurality of cans in a honeycomb configuration.

FIG. 1 is a schematic representation of the tops of a plurality of beverage cans 10 in a "honeycomb" configuration. As previously mentioned, such a configuration is not readily usable by many types of packaging and other container processing machines. However, cans transported along by vibrating and moving conveyor belts tend to coalesce into just such a pattern.

Figure 2:
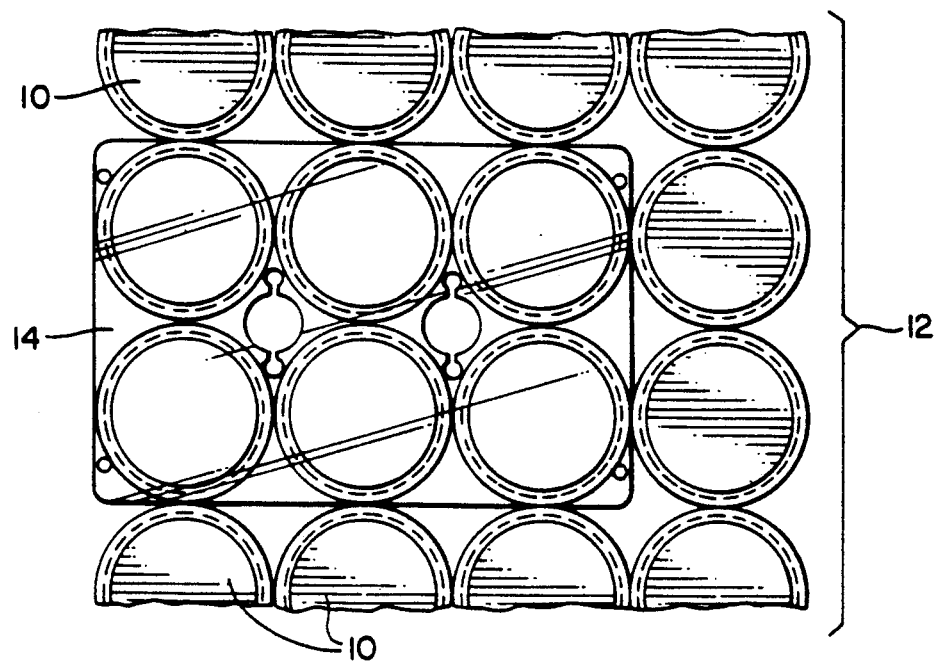
FIG. 2 is a schematic diagram illustrating a plurality of cans arranged in an orthogonal matrix.
Figure 14:
FIG. 14 illustrates a completed package.

FIG. 2 illustrates a group of cans arranged in an orthogonal array 12 in which 6-packs (such as the one indicated generally at 13 in FIG. 14 may be readily formed. As described in greater detail below, once the array is in position, a plurality of sheets 14 of heat softened malleable plastic may be formed about the tops of two by three orthogonal arrays of cans. Each plastic sheet 14 binds the six cans together and provides a convenient hand-hold for carrying the 6-pack. Unfortunately, it has been found that the orthogonal array illustrated in FIG. 2 is relatively unstable on a moving, vibrating conveyor belt and as a consequence, the cans tend to revert back to the honeycomb configuration of FIG. 1.

Figure 3:
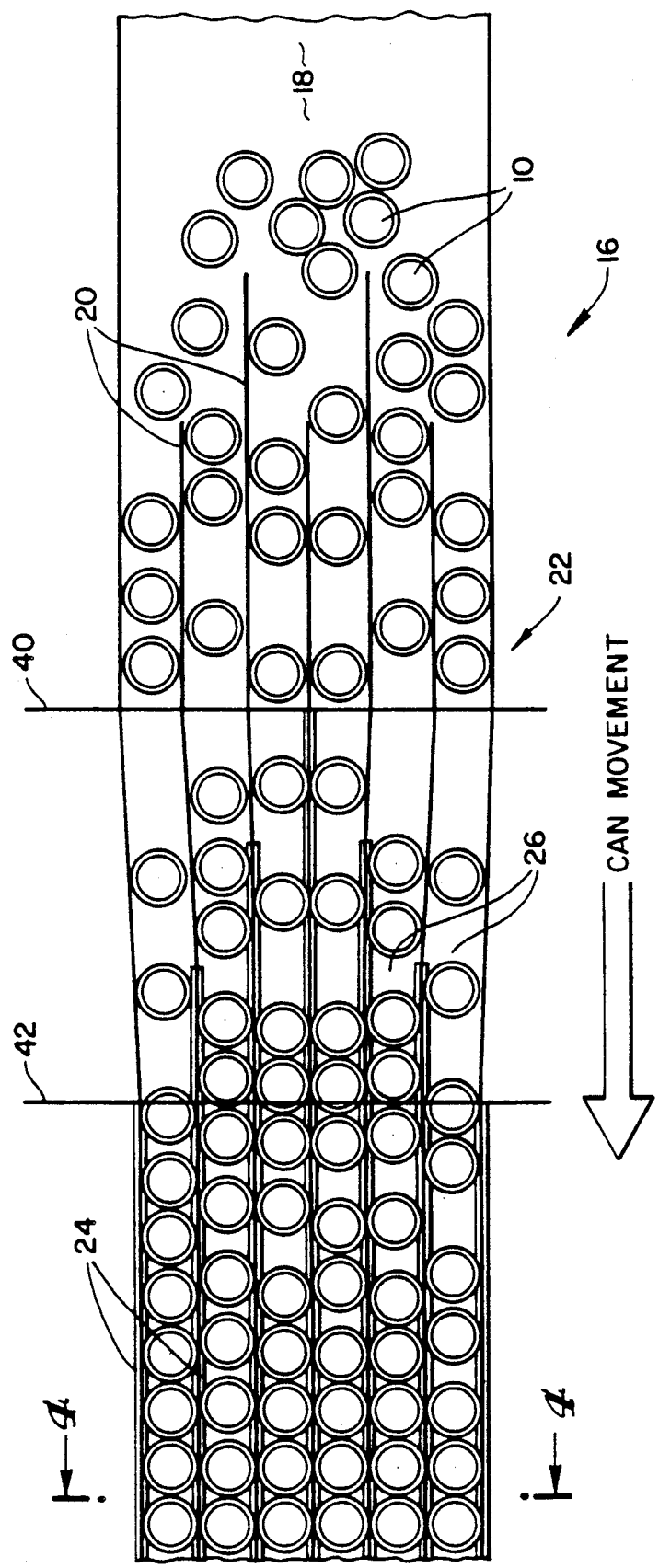
FIG. 3 is a top view of a conveyor belt system in accordance with a preferred embodiment of the present invention.

FIG. 3 illustrates a conveyor system indicated generally at 16, which in accordance with one aspect of the present invention, is capable of grouping containers, such as cans, in a particular array and maintaining the containers in that array for as long as required by the particular processing equipment. The conveyor system 16 first separates the cans 10 being transported by a conveyor belt 18 into individual rows. In the illustrated embodiment, partitions 20 of varying lengths are used to divide the conveyor spaces into successively narrower passageways to channel the cans into rows. The partitions 20 physically prevent the cans of one row from touching the sides of the cans of the adjacent rows. The partitions 20 may be fabricated from 10-gauge thick stainless steel, for example.

Figure 4:
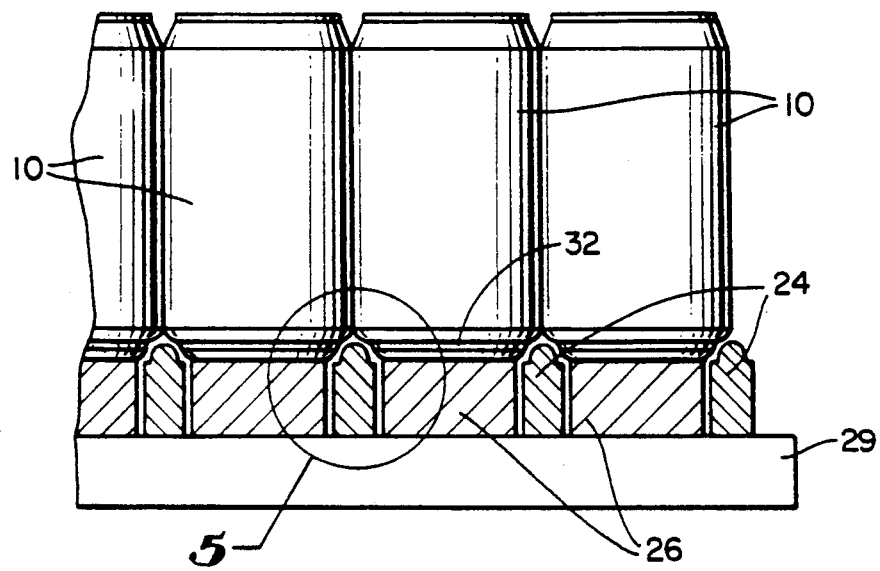
FIG. 4 is a cross-sectional view of the conveyor system of FIG. 3 as viewed along the lines 4—4 FIG. 3.
Figure 5:
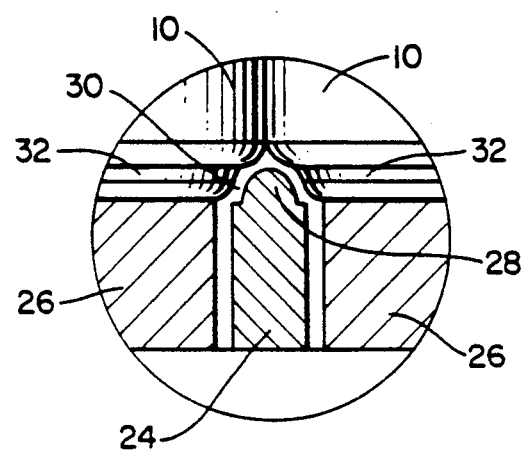
FIG. 5 is an enlarged view of a guide rail of FIG. 4.

Once the individual rows have been established, the partitions 20 are used to guide the cans to guide rails 24 which will allow cans on either side of each guide rail to touch but not jump the rail. FIG. 4 is a cross-sectional view of the guide rails 24. FIG. 5 depicts an enlarged view of the guide rail 24. As shown in FIGS. 4 and 5, the conveyor system 16 has an individual conveyor belt 26 between each pair of adjacent guide rails 24. The guide rails are supported by an underlying base 29 over which the conveyor belts 26 slide. As better seen in FIG. 5, the top portion 28 of each guide rail 24 extends above the top plane of the conveyor belts 26 and thus extends into the gap 30 between adjacent bases 32 of adjacent cans 10. The top portion 28 of the guide rail 24 does not extend above the height of the base of each can and is shaped to substantially conform to the gap 30 between adjacent cans. The height and contoured shape of the top portion 28 of each guide rail 24 assists in the prevention of cans from jumping over the guide rails 24 as the cans travel on the conveyor belts 26 yet allows the adjacent cans to touch.

Referring back to FIG. 3, the partitions 20 are bent about an axis 40 to smoothly and gradually move the rows of cans together as the cans on the conveyor belts 26 transition from the tall upright and relatively thick partitions 20 to the much lower and more closely spaced guide rails 24. As shown in FIG. 3, the transitions from the partitions 20 to the guide rails 24 are staggered to further smooth the movement of the cans together. By the time the cans reach the end of the last partitions 20 as indicated at 42, the sides of all of the individual rows of the cans are the adjacent rows touching.

In another aspect of the present invention, the conveyor system 16 further includes columns of alignment members 50a–52c, which as illustrated in FIG. 6, cooperate with the guide rails 24 and moving conveyor belts 26 to align the individual rows of can into, in the illustrated embodiment, an orthogonal array of cans. In addition, the cans of each column of the array are touching side to side and the cans of each row are touching side to side. As will be explained in greater detail below, the alignment members 50a–50c by cyclicly blocking the passage of the cans and then retracting to allow the cans to pass, stage the cans through the conveyor system work station in an orderly fashion to achieve the orthogonal array depicted.

Figure 7B:
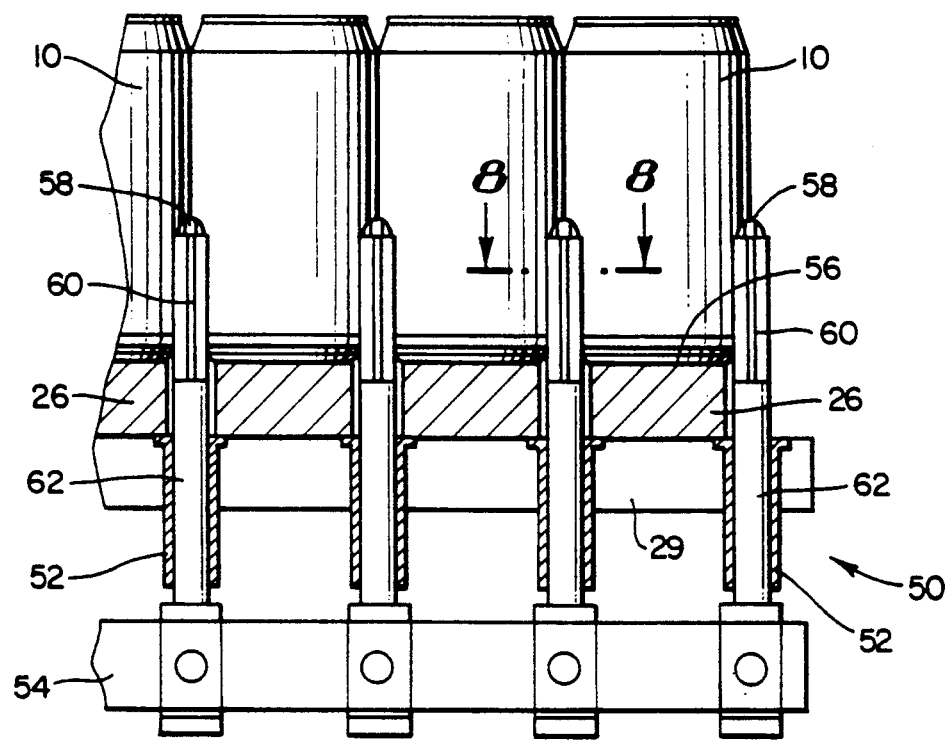
Figure 8:
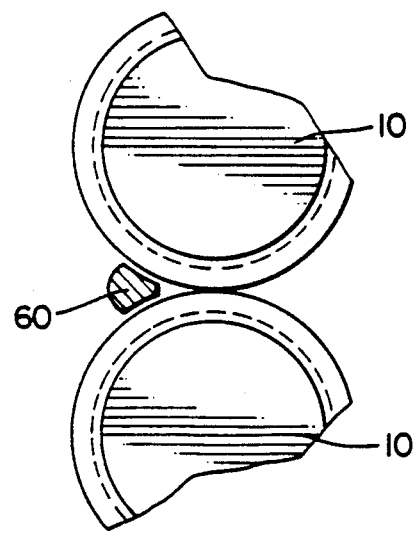
FIG. 8 is a cross-sectional view of an alignment pin engaging two adjacent cans of FIG. 7(b) as viewed along the lines 8—8 in FIG. 7(b).

FIGS. 7a, 7b and 8 show the alignment members 50 in greater detail. The alignment members 50a–50c are constructed identically and, in the illustrated embodiment, are shaped generally as a pin as depicted in FIGS. 7a and 7b. Each alignment member (hereinafter referred to as an alignment pin) is aligned with a guide rail 24. A bushing 52 guides the pin to move up and down under force applied to it by a connecting rod 54 which actuates an associated column of alignment pins together. Thus, the column 50a of alignment pins all move up and down together; the column 50b of alignment pins all move up and down together and the column 50c of alignment pins all move up and down together. The connecting rods 54 associated with each column of alignment pins are actuated by air cylinders (not shown) or other suitable actuators.

FIG. 7a depicts the alignment pins 50 in the down or retracted position. In this position, the main body 62 of each pin 50 is below the top surface 56 of each conveyor belt 26. Only a small tip 58 protrudes above the top surface 56 of the conveyor belts 26. This tip 58 of each alignment pin 50 is shaped similarly to the top portion 28 of the guide rails 24 such that the tip 58 also conforms substantially to the shape of the gaps between the bases of adjacent touching cans. Thus, when the alignment pins 50 are in the down or retracted position, the cans may freely pass by the pins as if the guide rail 24 was uninterrupted.

FIG. 7b illustrates the alignment pins 50 in the "up" or deployed position. In this position, a substantial portion 60 of each deployed pin is above the top level 56 of the conveyor belts such that adjacent pins are positioned to engage cans directed between them. The alignment pins 50 have sufficient stiffness to stop further progression of the cans so long as the pins 50 are deployed. The base 62 of each alignment pin is generally circular in cross-sections to provide a good bearing surface as the pin is actuated up and down within the associated bushing 52. However, as best seen in FIG. 8, the top portion 60 of each alignment pin is contoured to match the shape of the sidewall of the can as the pin 50 engages the can in the deployed position. The matching contour of the alignment pins has a number of advantages including providing an increased surface area for contacting the can sidewall, thus distributing the forces required to stop or restrain the can in a manner that minimizes denting or otherwise damaging the can. In addition, this cross-sectional shape maximizes the clearance between the alignment pins 50 and the cans as the pins are raised between the cans as shown in FIG. 6.

FIGS. 9a–9f illustrate the staging operation of the alignment pins to form the precisely positioned arrays of cans for packaging or other processing. In these figures, the cans move from right to left under the influence of the underlying conveyor belts 26 which slip underneath the cans when the cans are stopped along their path by the can alignment pins 50. The first column of can alignment pins 50a defines an outfeed station, the middle column of alignment pins 50b defines a processing station and the third column of alignment pins 50c defines an infeed station.

Figure 9A:
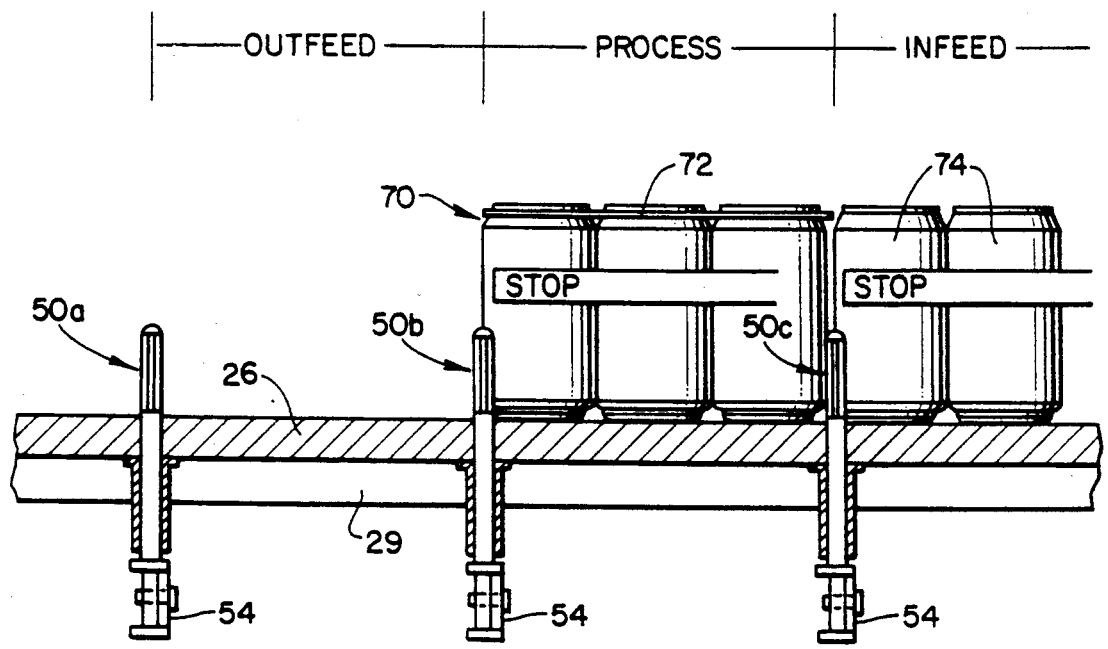

In FIG. 9a, all three columns of alignment pins 50a–50c are shown in the up or deployed position, with the middle pins 50b and the infeed pins 50c engaging and holding cans 10 against the forward motion encouraged by the underlying conveyor belt 26 which is moving from right to left. At this stage, a heat softened plastic sheet is formed over a two by three orthogonal array 70 of cans to form a carrier 72 which binds six cans as a 6-pack.

Figure 9B:
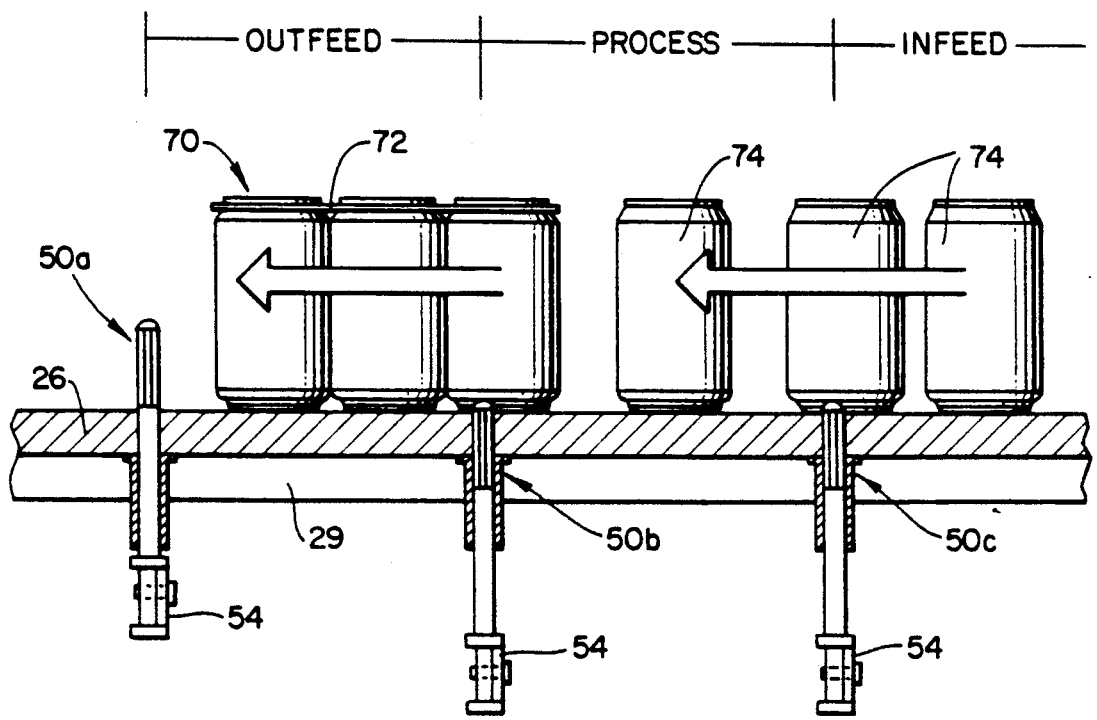
Figure 9C:
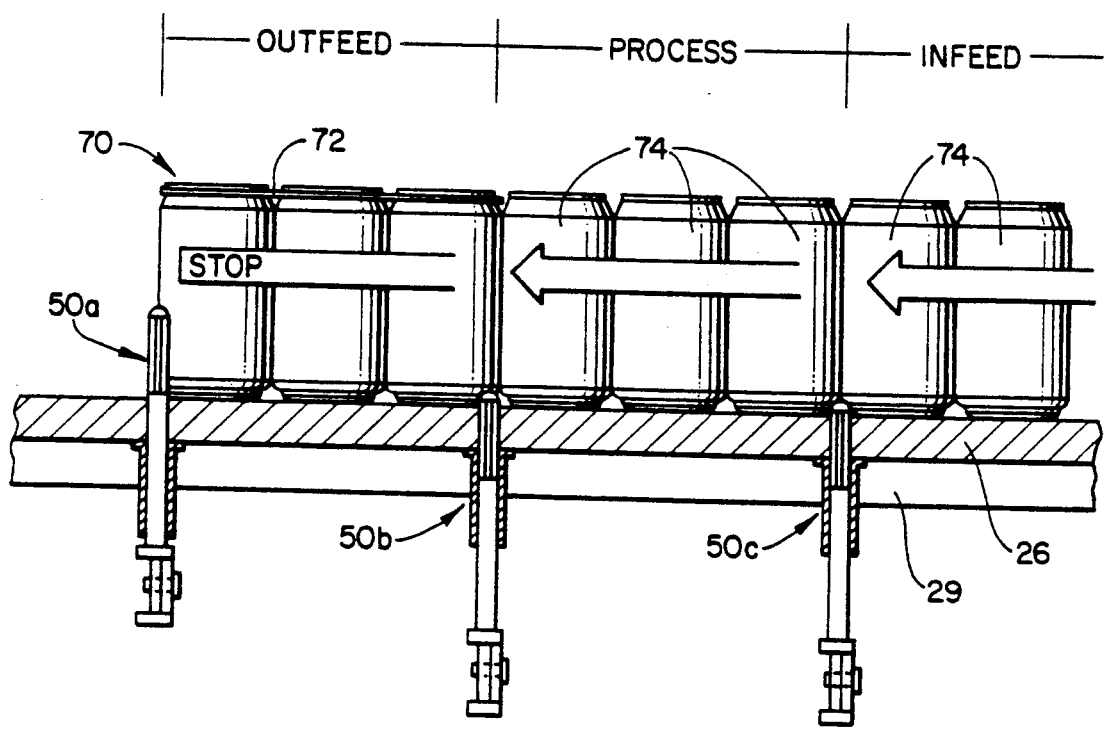

In the next stage depicted in FIG. 9b, the middle pins 50b and the infeed pins 50c are retracted, allowing the conveyor belt 26 to move the finished package 70 secured by the carrier-72 toward the outfeed pins 50a. As shown in FIG. 9c, the package 70 reaches the deployed outfeed pins 50a and stops. As the conveyor belt 26 continues to run, more infeeding cans 74 fill in behind the package 70 and take up all the available space until all are touching in the direction of can travel.

Figure 9D:
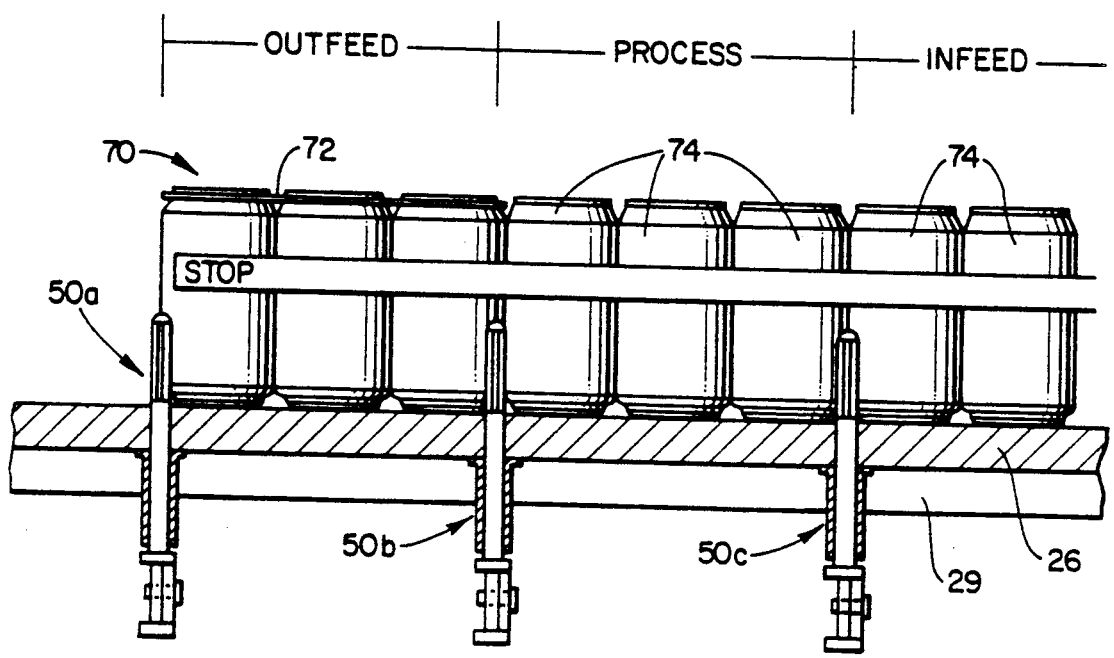

Next, as shown in FIG. 9d, with all the cans stopped, the middle alignment pins 50b and the infeed alignment pins 50c are raised again. As best seen in FIG. 6, the middle alignment pins 50b and the infeed alignment pins 50c are spaced from the outfeed pins 50a, taking into account the diameters of the cans, such that as the middle alignment pins 50b and infeed pins 50c are raised, the pins 50b and 50c clear the cans and have appreciable room to move up freely. As will be explained in greater detail below, it should be noted that the middle column of alignment pins 50b are spaced a greater distance from the next upstream column 80 of cans than are the infeed column pins 50c spaced from the next upstream column 82 of cans.

After the alignment pins 50b and 50c have been deployed, the outfeed pins 50a are retracted as shown in FIG. 9e. This allows the package 70 to move forward with the conveyor belt and move onto another work station. As the package 70 moves forward, the trailing cans can also move forward until the middle column of alignment pins 50b and the infeed column of alignment pins 50c are engaged as shown in FIG. 9e and FIG. 10. Because the gap between the alignment pins 50b and 50c is greater than the gap between the alignment pins 50a and 50b, a gap 90 is formed in the incoming cans 74 to define a new array 92 of cans in the processing station for packaging. One important advantage of the gap 90 is that the line pressure of the infeeding cans caused by the moving conveyor belt 26 is isolated from the array 92 of cans in the processing station. As a consequence, the array of cans 92 will not be distorted by the can line pressure. A heat softened malleable plastic sheet 14 may then be applied to the tops of the cans 92 to form a new package as shown in FIG. 9a, and the process is repeated In the illustrated embodiment, the conveyor belt 26 stops as the package is formed and is then restarted as the stages of FIG. 9a, etc., are repeated.

Figure 11:
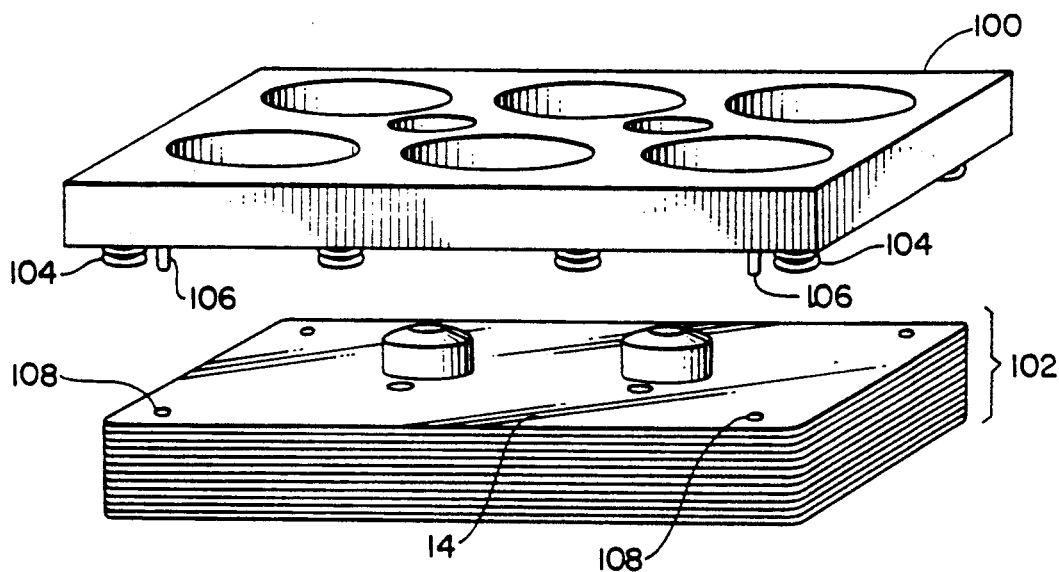
FIG. 11 illustrates a form plate picking up a plastic sheet.
Figure 12:
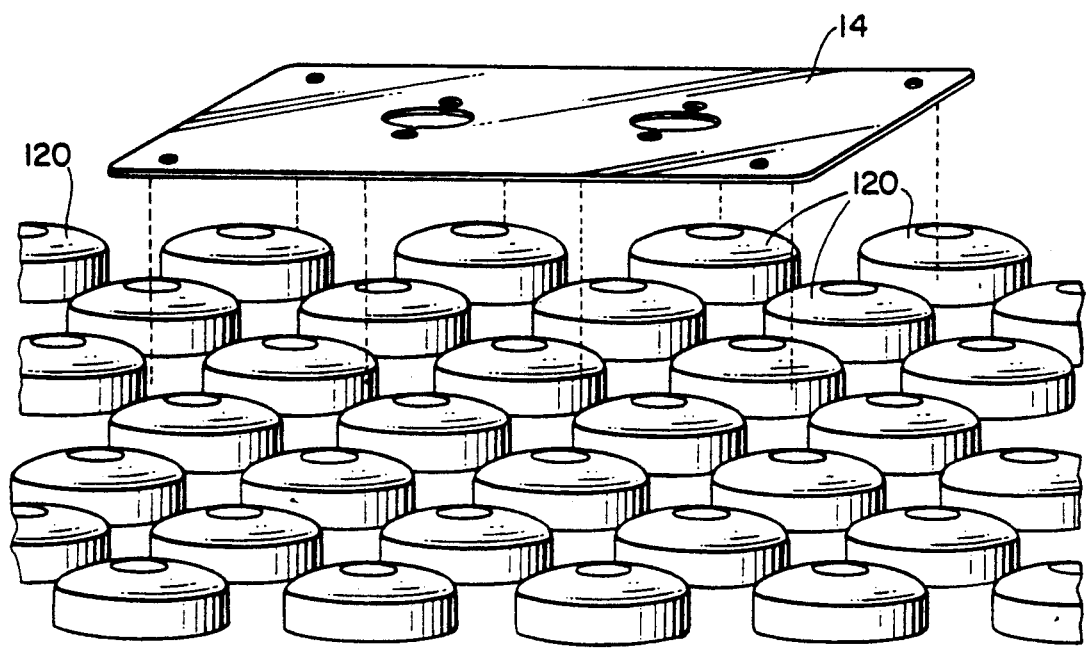
FIG. 12 illustrates heat printing the plastic sheet of FIG. 11.

The process for forming a heat printed carrier is described in U.S. Pat. No. 4,688,367 which is incorporated herein by reference. FIGS. 11-14 illustrate the adaptation of this process to the formation of 6-pack carriers. As shown in FIG. 11, a form plate 100 picks up a plastic sheet 14 from a stack 102 of such plastic sheets using vacuum cups 104 and registration pins 106 which register with alignment holes 108 of the plastic sheets. Although the process will be described for the formation of a single 6-pack carrier, it should be appreciated that many such carriers can be formed simultaneously by utilizing a forming plate 100 of sufficient size.

Figure 13:
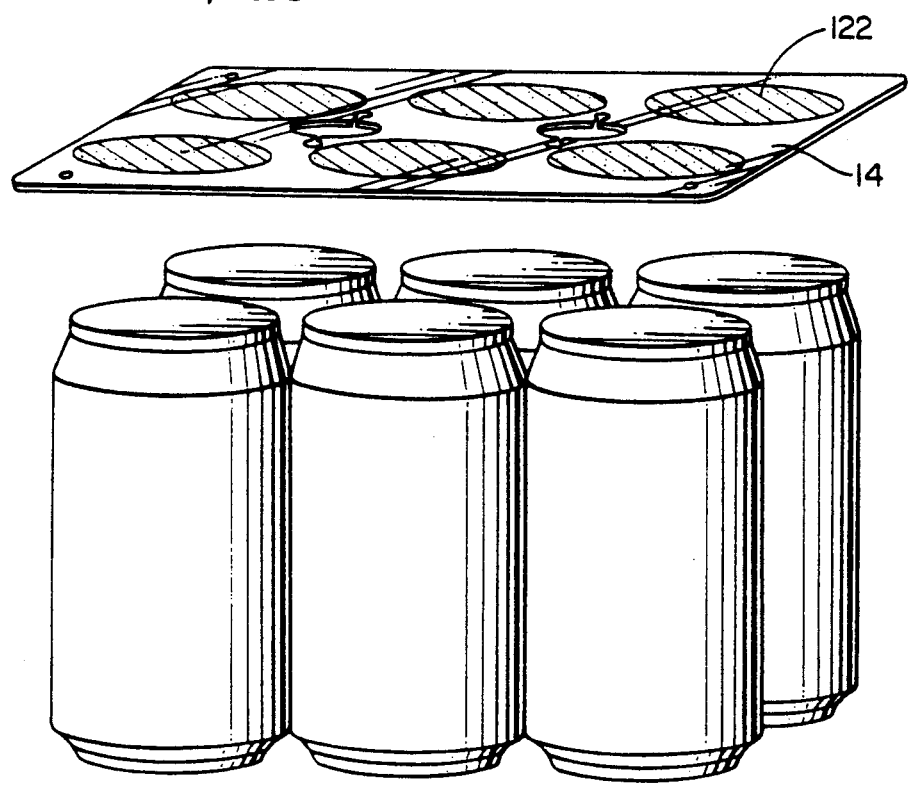
FIG. 13 illustrates positioning the heat printed sheet over an array of containers.

Once the plastic sheet has been picked up by the forming plate 100, the forming plate (not shown) places each sheet in contact with six heater buttons of an array of such heater buttons 120 which are arranged in precise registration with the articles to be covered. The heater buttons create distinct heated areas 122 on each sheet 14 as shown in FIG. 13. The forming plate 100 (not shown) then places the heat printed sheet 14 on the top of a two by three orthogonal array of cans at the processing station as shown in FIG. 9f to produce a 6-pack carrier as shown in FIG. 14.

It will, of course, be understood that various modifications of the present invention, in its various aspects, will be apparent to those skilled in the art, some being apparent only after study and others being matters of routine mechanical and electromechanical design. For example, the conveyor system of the present invention may be used with other processing and packaging operations. In addition, the alignment members and guide rails may have other shapes and may be positioned as required to form a variety of arrays. As such, the scope of the invention should not be limited by the particular embodiments herein described. It should be defined instead by the appended claims and equivalents thereof.

I claim:

1. A conveyor system for grouping containers, the bases of said containers defining a gap when the sides of the containers are touching comprising:

a pair of horizontal conveyor belts for carrying and transporting containers in an upright position on the conveyor belts;

a guide rail disposed between the adjacent conveyor belts and positioned to engage the bases of the containers on adjacent conveyor belts, said guide rail having a height and contour which conform substantially to said gap so that the guide rail allows adjacent containers to touch each other but inhibits the containers from jumping the rail;

a vertical alignment pin positioned transverse and between adjacent conveyor belts, said pin being vertically movable between a retracted position which allows containers on the conveyor belt to pass over the pin, and a deployed position in which the pin engages adjacent containers moving on the belts to stop further advancement of the containers, said pin having lateral surfaces positioned to engage the sides of the containers when the pin is in the deployed position, said lateral surfaces being shaped to conform to the contour of the side of the container; and means for moving the alignment pin vertically and orthogonally to the conveyor belt between the retracted and deployed positions;

wherein the alignment pin is aligned with the guide rail and the alignment pin has a top surface shaped to conform substantially to the contour of the guide rail and the gap defined by two adjacent touching containers wherein the top surface of the alignment pin is positioned to engage the bases of the passing containers in the retracted position.

2. The conveyor system of claim 1 wherein each lateral surface is concave.

3. A conveyor system for grouping containers, the bases of said containers defining a gap when the sides of the containers are touching comprising:

a plurality of horizontal conveyor belts, each belt for transporting a row of containers in an upright position;

a plurality of guide rails, each guide rail being disposed between adjacent conveyor belts and positioned to engage the bases of the containers on adjacent conveyor belts;

means for grouping the containers in orthogonal arrays of touching containers, including a plurality of columns of vertical alignment pins, each column of pins being vertically movable between a retracted position which allows containers on the conveyor belts to pass over the pins, and a deployed position in which the pins engage containers moving on the belts to stop further advancement of the containers moving on the belts; and means for moving the alignment pins vertically and orthogonally between adjacent conveyor belts between the retracted and deployed positions;

wherein each pin is positioned to engage the bases of the passing containers in its retracted position.

* * * * *